(12) United States Patent
Lee et al.

(10) Patent No.: US 11,067,847 B2
(45) Date of Patent: Jul. 20, 2021

(54) POLARIZER PROTECTIVE FILM, POLARIZING PLATE COMPRISING SAME, AND LIQUID CRYSTAL DISPLAY DEVICE COMPRISING POLARIZING PLATE

(71) Applicant: LG CHEM, LTD., Seoul (KR)

(72) Inventors: Hanna Lee, Daejeon (KR); Kyungki Hong, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 263 days.

(21) Appl. No.: 15/744,035

(22) PCT Filed: Sep. 13, 2016

(86) PCT No.: PCT/KR2016/010384
§ 371 (c)(1),
(2) Date: Jan. 11, 2018

(87) PCT Pub. No.: WO2017/048079
PCT Pub. Date: Mar. 23, 2017

(65) Prior Publication Data
US 2018/0203293 A1    Jul. 19, 2018

(30) Foreign Application Priority Data

Sep. 15, 2015   (KR) .................. 10-2015-0130368

(51) Int. Cl.
*G02F 1/1335*   (2006.01)
*G02B 1/04*   (2006.01)
(Continued)

(52) U.S. Cl.
CPC ......... *G02F 1/133528* (2013.01); *G02B 1/04* (2013.01); *G02B 1/14* (2015.01);
(Continued)

(58) Field of Classification Search
CPC ... G02B 1/04; G02B 1/14; G02B 5/22; G02B 5/223; G02B 5/30; G02B 5/305;
(Continued)

(56) References Cited

U.S. PATENT DOCUMENTS 4,920,004 A * 4/1990 Bagchi .................. G03C 1/95
428/407
5,185,074 A   2/1993 Yokoyama et al.
(Continued)

FOREIGN PATENT DOCUMENTS

CN     101253431     8/2008
CN     103026274     4/2013
(Continued)

OTHER PUBLICATIONS

U.S. Appl. No. 15/744,037.

*Primary Examiner* — Sophie Hon
(74) *Attorney, Agent, or Firm* — Dentons US LLP

(57) ABSTRACT

The present specification relates to a wide color gamut film including a transparent substrate; a wide color gamut layer provided on one surface of the transparent substrate, and including a compound including a photocurable functional group and a dye or a pigment having a maximum absorption wavelength of 580 nm to 610 nm; a surface layer provided on the wide color gamut layer, wherein the transparent substrate, the wide color gamut layer and the surface layer are consecutively laminated, and a polarizing plate and a liquid crystal display device including the same.

20 Claims, 1 Drawing Sheet

(51) Int. Cl.
*G02B 1/14* (2015.01)
*G02F 1/13357* (2006.01)
*G02B 5/22* (2006.01)
*G02B 5/30* (2006.01)

(52) U.S. Cl.
CPC ............... *G02B 5/22* (2013.01); *G02B 5/223* (2013.01); *G02B 5/30* (2013.01); *G02B 5/305* (2013.01); *G02F 1/133602* (2013.01); *G02F 1/133606* (2013.01); *G02F 1/133609* (2013.01); *C09K 2323/031* (2020.08)

(58) Field of Classification Search
CPC ......... G02F 1/133528; G02F 1/133602; G02F 1/133606; G02F 1/133609; Y10T 428/1041; C09K 2323/031
See application file for complete search history.

(56) References Cited

U.S. PATENT DOCUMENTS

| | | | |
|---|---|---|---|
| 6,824,712 B1 * | 11/2004 | Yang | C09B 47/00 252/582 |
| 2002/0039651 A1 | 4/2002 | Murata | |
| 2003/0123127 A1 * | 7/2003 | Yamamoto | G02F 1/167 359/296 |
| 2005/0046321 A1 * | 3/2005 | Suga | G02B 5/0226 313/112 |
| 2005/0249932 A1 | 11/2005 | Wang et al. | |
| 2006/0292462 A1 | 12/2006 | Seo et al. | |
| 2007/0231478 A1 * | 10/2007 | Watanabe | G02B 1/111 427/162 |
| 2008/0048156 A1 | 2/2008 | Ahn et al. | |
| 2010/0103355 A1 * | 4/2010 | Sakamoto | G02F 1/133509 349/106 |
| 2010/0321607 A1 * | 12/2010 | Utsumi | G02F 1/133514 349/61 |
| 2011/0051052 A1 * | 3/2011 | Tasaka | C09B 31/043 349/96 |
| 2012/0075568 A1 | 3/2012 | Chang et al. | |
| 2013/0265522 A1 | 10/2013 | Jung et al. | |
| 2014/0124716 A1 | 5/2014 | Lin et al. | |
| 2015/0234097 A1 | 8/2015 | Kang et al. | |
| 2016/0047948 A1 | 2/2016 | Kim et al. | |
| 2016/0054481 A1 | 2/2016 | Kim et al. | |
| 2016/0146978 A1 | 5/2016 | Lee et al. | |
| 2016/0161801 A1 | 6/2016 | Watano et al. | |
| 2016/0272884 A1 | 9/2016 | Kim et al. | |
| 2016/0349573 A1 | 12/2016 | Ohmura et al. | |
| 2018/0246356 A1 * | 8/2018 | Lin | H01L 25/0753 |

FOREIGN PATENT DOCUMENTS

| | | |
|---|---|---|
| CN | 105102490 | 11/2015 |
| EP | 1930748 A1 | 6/2008 |
| JP | S58203416 | 11/1983 |
| JP | H10-26704 | 1/1998 |
| JP | 2000-043175 | 2/2000 |
| JP | 2000-352613 | 12/2000 |
| JP | 2001-343519 | 12/2001 |
| JP | 2002-097383 | 4/2002 |
| JP | 2003-036033 | 2/2003 |
| JP | 2003207887 A * | 7/2003 |
| JP | 2003-248218 | 9/2003 |
| JP | 2005-200608 | 7/2005 |
| JP | 2005-300984 | 10/2005 |
| JP | 2007-004108 | 1/2007 |
| JP | 2008-003425 | 1/2008 |
| JP | 2008-145480 | 6/2008 |
| JP | 2008-239592 | 10/2008 |
| JP | 2010-134349 | 6/2010 |
| JP | 2010-256768 | 11/2010 |
| JP | 2012-042537 | 3/2012 |
| JP | 2014-041301 | 3/2014 |
| JP | 2014-182274 | 9/2014 |
| JP | 2015-036734 | 2/2015 |
| KR | 10-2008-0012147 | 2/2008 |
| KR | 10-2011-0077105 | 7/2011 |
| KR | 10-2012-0010212 | 2/2012 |
| KR | 10-2012-0078435 | 7/2012 |
| KR | 10-2013-0072048 | 7/2013 |
| KR | 10-2013-0112990 | 10/2013 |
| KR | 10-2014-0118873 | 10/2014 |
| KR | 10-2014-0118875 | 10/2014 |
| KR | 10-2014-0148335 | 12/2014 |
| WO | 2014-035062 | 3/2014 |
| WO | 2014-157963 | 10/2014 |
| WO | 2014-157964 | 10/2014 |
| WO | 2015064864 | 5/2015 |
| WO | 2015-098906 | 3/2017 |

* cited by examiner

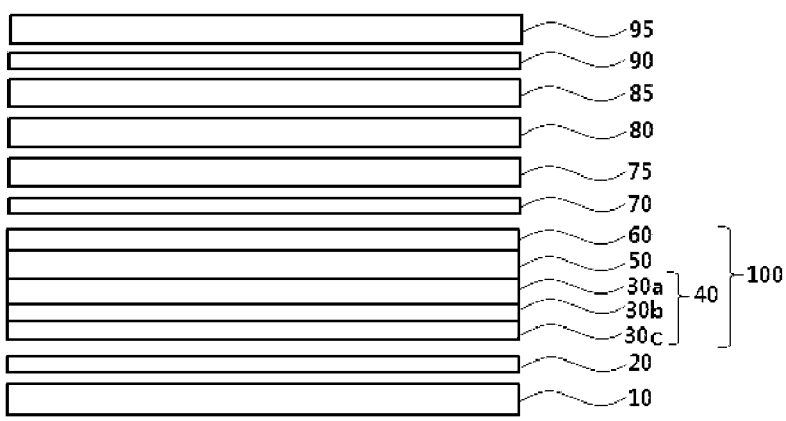

POLARIZER PROTECTIVE FILM, POLARIZING PLATE COMPRISING SAME, AND LIQUID CRYSTAL DISPLAY DEVICE COMPRISING POLARIZING PLATE

TECHNICAL FIELD

This application is a National Stage Application of International Application No. PCT/KR2016/010384 filed on Sep. 13, 2016, which claims priority to and the benefit of Korean Patent Application No. 10-2015-0130368, filed with the Korean Intellectual Property Office on Sep. 15, 2015, both of which are incorporated herein in their entirety by reference for all purposes as if fully set forth herein.

The present specification relates to a wide color gamut film, a polarizing plate including the same, and a liquid crystal display device including the polarizing plate.

BACKGROUND ART

Liquid crystal display (LCD) devices are one of flat displays most widely used currently. Generally, a liquid crystal display device has a structure sealing a liquid crystal layer between a thin film transistor (TFT) array substrate and a color filter substrate. When an electric field is applied to electrodes present on the array substrate and the color filter substrate, an arrangement of liquid crystal molecules of the liquid crystal layer sealed therebetween changes, and an image is displayed using the same.

A liquid crystal display device obtains color images by cutting a specific spectrum of a backlight light source using a color filter, and color purity is affected by characteristics of the light source or the color filter, and further, various constituents such as a polarizing plate or an alignment layer.

Among these, one of the top causes affecting the color purity is light emission spectrum characteristics of the light source irradiating light from the back of a liquid crystal panel. In light emission spectrum distribution of a light source such as a cold cathode fluorescent lamp (CCFL), a hot cathode fluorescent lamp (HCFL) or a light emitting diode (LED), light emission spectra are present between each RGB wavelength as a sub band in addition to wavelength regions corresponding to RGB, and this is color-mixed with a color filter causing decline in the color reproduction. For example, distribution characteristics of light emission spectra of a cold cathode fluorescent lamp (CCFL) has impure light emission spectra near 490 nm and 590 nm that are between dominant wavelengths of each RGB base color, and therefore, light penetrating a color filter produces color mixing causing a problem of narrowing a color reproduction region.

Attempts to improve color reproduction through optimizing a color filter have been made, however, a brightness decrease has become a problem. Accordingly, demands for technology development for improving color reproduction of a liquid crystal display device are still present.

DISCLOSURE

Technical Problem

The present specification is directed to providing a wide color gamut film, a polarizing plate including the same, and a liquid crystal display device including the polarizing plate. Specifically, the present specification is directed to providing a wide color gamut film capable of enhancing color gamut of a liquid crystal display device (LCD) without changing a backlight or a color filter, and, when used as a protective film of a lower polarizing plate in a device, improving issues of both enhancement in the color reproduction and damage on the lower protective film of the polarizing plate, a polarizing plate including the same, and a liquid crystal display device including the polarizing plate.

Technical Solution

One embodiment of the present specification provides a wide color gamut film including a transparent substrate; a wide color gamut layer provided on one surface of the transparent substrate, and including a compound including a photocurable functional group and a dye or a pigment having a maximum absorption wavelength of 580 nm to 610 nm; and a surface layer provided on the wide color gamut layer, wherein the transparent substrate, the wide color gamut layer and the surface layer are consecutively laminated.

According to another embodiment of the present specification, the wide color gamut layer may further include a dye or a pigment having a maximum absorption wavelength present within 480 nm to 510 nm.

Another embodiment of the present specification provides a polarizing plate including a polarizer; and the wide color gamut film provided on at least one surface of the polarizer as a protective film.

Still another embodiment of the present specification provides a liquid crystal display device including a backlight unit; a liquid crystal panel provided on one side of the backlight unit; and the polarizing plate of the embodiment described above provided between the backlight unit and the liquid crystal panel, wherein the polarizing plate is provided such that the wide color gamut film faces the backlight unit.

Advantageous Effects

Dyes or pigments have a low molecular weight and do not have a bonding functional group, and therefore, binding a dye or a pigment with a coating composition is generally difficult. Accordingly, when a coating layer has an insufficient degree of cure or is thin, a dye or a pigment may be smeared to the surface, and may move to the surface even when the coating layer has a sufficient degree of cure, which may cause a problem in durability, particularly, durability under a moist heat resistance environment. A wide color gamut film according to embodiments of the present specification is provided with a surface layer while including a wide color gamut layer including a dye or a pigment for wide color reproduction, and therefore, a problem of the dye or the pigment moving to the surface or being smeared out of the surface may be prevented.

In addition, by forming a surface layer separately from a wide color gamut layer including a dye or a pigment, functions such as high hardness, scratch resistance, antireflection and antiglare may be provided to the surface layer. Particularly, when providing properties such as high hardness and scratch resistance, the wide color gamut film may be used as a polarizer protective film of a polarizing plate provided between a liquid crystal panel and a backlight unit on the backlight side, and in this case, a liquid crystal display device becomes thin and has a large area preventing the polarizing plate from being damaged by being brought into contact with the backlight side even when sagging occurs in the polarizing plate, and excellent optical properties can be obtained by preventing an increase in the haze. Moreover, such an effect can be obtained by applying the present disclosure to a lower polarizing plate of a liquid crystal display device without changing such a color filter or a lamination structure of the liquid crystal display device, and the like, and therefore, production costs can be reduced since excessive process modifications or cost increases are not required.

DESCRIPTION OF DRAWINGS

FIG. 1 is a diagram illustrating a liquid crystal display according to one embodiment of the present specification.

REFERENCE NUMERAL

1: Liquid Crystal Display Device
10: Backlight Unit
20: Prism Sheet
30a: Substrate
30b: Wide color gamut Layer
30c: Surface Layer
40: Wide color gamut Film
50: Polarizer
60: Polarizer Protective Film
70: Lower Glass Substrate
75: Thin Film Transistor
80: Liquid Crystal Layer
85: Color Filter
90: Upper Glass Substrate
95: Upper Polarizing Plate
100: Polarizing Plate

MODE FOR DISCLOSURE

Hereinafter, the present specification will be described in more detail.

One embodiment of the present specification relates to a wide color gamut film including a transparent substrate; a wide color gamut layer provided on one surface of the transparent substrate, and including a compound including a photocurable functional group and a dye or a pigment having a maximum absorption wavelength of 580 nm to 610 nm; and a surface layer provided on the wide color gamut layer, wherein the transparent substrate, the wide color gamut layer, and the surface layer are consecutively laminated.

According to the embodiment, the wide color gamut layer includes a dye or a pigment having a maximum absorption wavelength of 580 nm to 610 nm. The dye or the pigment has a maximum absorption wavelength present within approximately 580 nm to approximately 610 nm, an orange color region. According to one example, the maximum absorption wavelength of the dye or the pigment is present within approximately 585 nm to approximately 600 nm and specifically within 590 nm to 600 nm.

The dye or the pigment satisfying the above-described condition absorbs unnecessary light particularly in a spectrum region band causing a color mixing problem with a color filter among light entering from a backlight unit including a light source such as CCFL and LED of a liquid crystal display device, and therefore, color reproduction of a display may be significantly enhanced when using a wide color gamut film including the same in a polarizing plate or a liquid crystal display device.

According to one embodiment of the present specification, as the dye or the pigment, a dye or a pigment experiencing no or small changes in the transmittance of a composition including the dye or the pigment before and after ultraviolet (UV) curing is preferably used. Herein, the changes in the transmittance means changes caused by the dye or the pigment, and components experiencing changes in the transmittance by ultraviolet (UV) curing may be excluded in the composition when measuring the changes in the transmittance. For example, a composition including the dye or the pigment may have changes in the transmittance of less than 5% in a 650 nm to 710 nm region band before and after ultraviolet (UV) curing. Specifically, a composition including the dye or the pigment has changes in the transmittance, which is measured by the following Equation 1, of less than 5%, preferably less than 2% and more preferably less than 1%.

[Equation 1]
$$\text{changes in transmittance} = \frac{\begin{pmatrix} \text{average light transmittance in 650 nm to} \\ \text{710 nm region wavelength before } UV \text{ curing} - \\ \text{average light transmittance in 650 nm to} \\ \text{710 nm region wavelength after } UV \text{ curing} \end{pmatrix}}{\text{average light transmittance in 650 nm to}} \times 100$$
$$\text{710 nm region wavelength before } UV \text{ curing}$$

In Equation 1, the ultraviolet (UV) curing means coating a composition including a dye or a pigment on a transparent substrate, and curing the result by ultraviolet rays having a 290 nm to 320 nm wavelength with an irradiation amount of 20 mJ/cm² to 600 mJ/cm².

A composition including the dye or the pigment described above has changes in the transmittance of less than 5% in a 650 nm to 710 nm region band before and after ultraviolet (UV) curing, and the dye or the pigment hardly shows additional absorption peaks in a 650 nm to 710 nm wavelength region band even after ultraviolet (UV) curing, which is helpful in increasing brightness and enhancing color reproduction.

As such a dye or a pigment, dyes or pigments experiencing almost no changes in the optical properties themselves by ultraviolet (UV) curing as above may be used, or dyes or pigments that have not been used for ultraviolet (UV) curing due to changes in the optical properties such that new absorption peaks are produced in a 650 nm to 710 nm wavelength after ultraviolet (UV) curing through changes in the molecular structure caused by ultraviolet (UV) irradiation may also be used through core-shell type, or surface treatment or surface modification.

Specific examples of the dye or the pigment may include porphyrin derivative compounds, cyanine derivative compounds, squarylium derivative compounds or the like, but are not limited thereto.

According to another embodiment, the wide color gamut layer may further include a dye or a pigment having a maximum absorption wavelength within 480 nm to 510 nm. A dye or a pigment having a maximum absorption wavelength within 480 nm to 510 nm absorbs light in a cyan (bluish green color) region, and is capable of further improving color gamut. The dye or the pigment having a maximum absorption wavelength within 480 nm to 510 nm may have a maximum absorption wavelength within 485 nm to 500 nm.

As the dye or the pigment having a maximum absorption wavelength within 480 nm to 510 nm, azo series dye derivatives, coumarin series dye derivatives, fluorescein series dye derivatives, cyanine series dye derivatives, BODIPY series derivatives and the like may be used, however, the dye or the pigment having a maximum absorption wavelength within 480 nm to 510 nm is not limited thereto.

According to one embodiment of the present specification, the wide color gamut layer may include a compound including a photocurable functional group.

In a general curing process carried out by ultraviolet rays, optical properties of a dye or a pigment readily change causing a problem of declining optical properties of a film. In addition, although there are no changes in the optical properties caused by ultraviolet rays, a thermosetting resin composition including a dye or a pigment has a problem of not sufficiently satisfying surface hardness and scratch resistance properties as a polarizer protective film and the like. Accordingly, when the surface layer is formed on one surface of a thermoplastic resin composition, film hardness may decrease in addition to an adhesion decrease.

However, by including a compound including a photocurable functional group, the wide color gamut layer according to one embodiment of the present specification is capable of obtaining excellent color reproduction due to almost no or small changes in the light transmittance before and after ultraviolet curing, and in addition thereto, is capable of effectively protecting a lower polarizing plate due to excellent physical properties such as scratch resistance and high hardness, and therefore, is useful in a polarizing plate for a display that tends to be thinner and larger.

The compound including a photocurable functional group may further include a photocurable monofunctional monomer. The photocurable monofunctional monomer is not particularly limited, and examples thereof may include amino group-containing monomers such as N-substituted (meth)acrylate or N,N-substituted (meth)acrylate, hydroxyl group-containing monomers such as vinyl acetate or hydroxyalkyl (meth)acrylate, carboxyl group-containing monomers such as (meth)acrylic acid, 2-(meth)acryloyloxyacetic acid, 2-(meth)acryloyloxypropylic acid, 4-(meth)acryloyloxy butylic acid, an acrylic acid dimer, itaconic acid, maleic acid or maleic anhydride, heteroring compounds such as vinyl pyrrolidone or acryloyl morpholine, 2-ureido-pyrimidinone group-containing monomers, and the like.

Specific examples thereof may preferably include tetrahydrofurfuryl acrylate (THFA), tetrahydrofurfuryl methacrylate (THFMA), hydroxyethyl acrylate (HEA), hydroxyethyl methacrylate (HEMA), carboxyethyl acrylate, carboxyethyl methacrylate and the like, but are not limited thereto. The photocurable monofunctional monomer may be included in 0 parts by weight to 20 parts by weight based on 100 parts by weight of the photocurable functional group-including compound or binder resin. By being included in 20 parts by weight or less, a decrease in the pencil hardness and the scratch resistance may be prevented.

According to an additional embodiment, the wide color gamut layer may further include a binder resin. The binder resin included in the wide color gamut layer may be a cured material of a compound having a photocurable functional group. Herein, the cured material of a compound having a photocurable functional group means a state produced as a result of the photocurable functional group participating in photocuring by light irradiation. Herein, the cured material includes only a part of the photocurable functional group participating in photocuring as necessary, as well as the whole photocurable functional group participating in photocuring by the light irradiation described above. In other words, some of the photocurable functional group may remain in the cured material.

The compound having a photocurable functional group is not particularly limited as long as it is a compound including an unsaturated functional group capable of producing a polymerization reaction by ultraviolet rays, and may be a compound including a (meth)acrylate group, an allyl group, an acryloyl group or a vinyl group as the photocurable functional group.

According to one embodiment of the present specification, the compound including a photocurable functional group may include one or more types selected from the group consisting of multifunctional acrylate-based monomers, multifunctional acrylate-based oligomers and multifunctional acrylate-based elastic polymers.

In the present specification, the acrylate-based means, in addition to acrylate, all of methacrylate, or derivatives introducing substituents to acrylate or methacrylate.

The multifunctional acrylate-based monomer means including two or more acrylate-based functional groups and has a weight average molecular weight of less than 1,000 g/mol. More specific examples thereof may include hexanediol diacrylate (HDDA), tripropylene glycol diacrylate (TPGDA), ethylene glycol diacrylate (EGDA), trimethylolpropane triacrylate (TMPTA), trimethylolpropane ethoxy triacrylate (TMPEOTA), glycerin propoxylated triacrylate (GPTA), pentaerythritol tri(tetra)acrylate (PETA), dipentaerythritol hexaacrylate (DPHA) or the like, however, the coating composition of the present disclosure is not limited thereto. The multifunctional acrylate-based monomer performs a role of providing certain pencil strength and abrasion resistance to the film by being crosslinked to each other, or crosslinked with a multifunctional acrylate-based oligomer and a multifunctional acrylate-based elastic polymer to be described below.

The multifunctional acrylate-based monomer may be used either alone, or as a combination of different types. The multifunctional acrylate-based oligomer is an oligomer including two or more acrylate functional groups, and may have a weight average molecular weight in a range of approximately 1,000 g/mol to approximately 10,000 g/mol, approximately 1,000 g/mol to approximately 5,000 g/mol or approximately 1,000 g/mol to approximately 3,000 g/mol.

According to one embodiment of the present specification, the multifunctional acrylate-based oligomer may have an elongation of approximately 5% to approximately 200%, approximately 5% to approximately 100%, or approximately 10% to approximately 50% when measured in accordance with the ASTM D638. When the acrylate-based oligomer has an elongation in the above-mentioned range, more superior flexibility and elasticity may be obtained without declining mechanical properties. The multifunctional acrylate-based oligomer satisfying such an elongation range has excellent flexibility and elasticity and forms a curing resin with the multifunctional acrylate-based monomer and a multifunctional acrylate-based elastic polymer to be described below, and may provide sufficient flexibility, curl property and the like to the protective film including the same.

According to one embodiment of the present specification, the multifunctional acrylate-based oligomer may be an acrylate-based oligomer modified with one or more types of urethane, ethylene oxide, propylene oxide or caprolactone. When using the modified multifunctional acrylate-based oligomer, flexibility is further provided to the multifunctional acrylate-based oligomer due to modification, and curl property and flexibility of a film may increase. In addition, the multifunctional acrylate-based oligomer may be used either alone or as a combination of different types.

The multifunctional acrylate-based elastic polymer has excellent flexibility and elasticity, and as a polymer including two or more functional groups, may have a weight average molecular weight in a range of approximately 100,000 g/mol to approximately 800,000 g/mol, approximately 150,000 g/mol to approximately 700,000 g/mol, or approximately 180,000 g/mol to approximately 650,000 g/mol.

A protective film formed by using a coating composition including the multifunctional acrylate-based elastic polymer may secure high elasticity or flexibility while securing mechanical properties, and may minimize curl or crack occurrences.

According to one embodiment of the present specification, the multifunctional acrylate-based elastic polymer may have an elongation of approximately 5% to approximately 200%, approximately 5% to approximately 100%, or approximately 10% to approximately 50% when measured in accordance with the ASTM D638. When the multifunctional acrylate-based elastic polymer has an elongation in the above-mentioned range, excellent flexibility and elasticity may be obtained without declining mechanical properties.

One example of the multifunctional acrylate-based elastic polymer may include polyrotaxane.

Polyrotaxane generally means a compound in which a dumbbell shaped molecule and a cyclic compound (macrocycle) are structurally fitted. The dumbbell shaped molecule includes a certain linear molecule and a blocking group disposed at both ends of such a linear molecule, and the linear molecule penetrates into the cyclic compound. The cyclic compound may move following the linear molecule, and a breakaway is prevented by the blocking group.

According to one embodiment of the present specification, the polyrotaxane may include a rotaxane compound including a cyclic compound to which a lactone-based compound having an acrylate-based compound introduced at the end bonds; a linear molecule penetrating the cyclic compound; and a blocking group disposed at both ends of the linear molecule to prevent a breakaway of the cyclic compound.

The cyclic compound may be used without particular limit as long as it has a size enough to penetrate or surround the linear molecule, and may include a functional group such as a hydroxyl group, an amino group, a carboxyl group, a thiol group or an aldehyde group capable of reacting with other polymers or compounds. Specific examples of such a cyclic compound may include α-cyclodextrin, β-cyclodextrin, γ-cyclodextrin or mixtures thereof.

In addition, as the linear molecule, compounds having a linear form while having a certain molecular weight or higher may be used without particular limit, and polyalkylene-based compounds or polycaprolactone groups may be used. Specifically, polyoxyalkylene-based compounds including an oxyalkylene repeating unit having 1 to 8 carbon atoms or polycaprolactone groups including a lactone-based repeating unit having 3 to 10 carbon atoms may be used.

Such a linear molecule may have a weight average molecular weight of approximately 1,000 g/mol to approximately 50,000 g/mol. When a weight average molecular weight of the linear molecule is too small, mechanical properties or a self-healing ability of a protective film prepared using the same may not be sufficient, and when the weight average molecular weight is too large, compatibility of a prepared protective film may decrease, or appearance properties or material uniformity may greatly decrease.

Meanwhile, the blocking group may be properly controlled depending on the properties of polyrotaxane prepared, and for example, one, two or more types selected from the group consisting of a dinitrophenyl group, a cyclodextrin group, an adamantane group, a trityl group, a fluorescein group and a pyrene group may be used.

Another example of the multifunctional acrylate-based elastic polymer may include a urethane-based acrylate polymer. The urethane-based acrylate polymer has a form of a urethane-based acrylate oligomer being linked to an acrylic polymer main chain as a side branch.

According to one embodiment of the present specification, among the compositions for forming the wide color gamut layer, the compound including a photocurable functional group described above preferably includes one or more types of multifunctional acrylate monomers or oligomers of trifunctional or tetrafunctional. Using such multifunctional acrylate monomers or oligomers of trifunctional or tetrafunctional is advantageous for a dye or a pigment not to be smeared out of a film surface.

According to one embodiment of the present specification, the wide color gamut layer may include the dye or the pigment having a maximum absorption wavelength of 580 nm to 610 nm in approximately 0.1 part by weight to approximately 5 parts by weight and preferably in approximately 0.1 part by weight to approximately 3 parts by weight when a total weight of the photocurable functional group-including compound or binder resin is employed as 100 parts by weight. When the dye or the pigment is included too little, an effect of enhancing color reproduction may not be sufficient due to an insignificant light absorption effect, and when included too much, brightness may decrease and other properties of the coating composition may decline, and in such an aspect, the dye or the pigment is preferably included in the above-mentioned parts by weight range.

According to another embodiment, the wide color gamut layer may include the dye or the pigment having a maximum absorption wavelength within 480 nm to 510 nm in 0.2 parts by weight to 1 part by weight when a total weight of the photocurable functional group-including compound or binder resin is employed as 100 parts by weight. In the above-mentioned range, the dye or the pigment may further enhance a wide color reproduction effect through absorbing light in a 480 nm to 510 nm region, and a brightness decrease may be prevented when the dye or the pigment is included in 1 part by weight or less.

According to one embodiment of the present specification, pencil hardness may be H or greater under a 500 g load measured from a wide color gamut layer side of the wide color gamut film.

Existing compositions including a photocurable resin and a dye have a problem in that stability of the dye is not secured. However, the wide color gamut layer of the wide color gamut film according to one embodiment of the present specification is capable of forming a light absorption layer with enhanced stability by including a compound including a photocurable functional group and a dye stable to radicals.

According to another embodiment, the wide color gamut layer may further include a photopolymerization initiator in addition to the binder resin described above. The photopolymerization initiator performs a role of allowing the compound including a photocurable functional group described above to initiate photopolymerization by light irradiation.

As the photopolymerization initiator, those known in the art may be used, and examples thereof may include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoyl formate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphosphine oxide or the like, but are not limited thereto. In addition, Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F and the like may be included as products currently commercially available. These photopolymerization initiators may be used either alone or as a mixture of two or more types different from each other.

According to one embodiment of the present specification, the content of the photopolymerization initiator is not particularly limited, however, the photopolymerization initiator may be included in approximately 0.1 part by weight to approximately 10 parts by weight and preferably in approximately 0.1 part by weight to approximately 5 parts by weight when a total weight of the photocurable functional group-including compound or binder resin is employed as 100 parts by weight, in order to accomplish effective photopolymerization without inhibiting properties of the composition for forming the wide color gamut layer.

According to one embodiment of the present specification, the photopolymerization initiator is preferably included in 0.5 parts by weight to 2 parts by weight with respect to 100 parts by weight of the photocurable functional group-including compound or binder resin. When using the photopolymerization initiator within this content range, changes in the spectrum occurring due to dye or pigment deformation caused by photopolymerization initiator radicals may be prevented. Accordingly, it is advantageous in preventing a transmittance increase in a 580 nm to 610 nm region and/or a transmittance decrease in a 650 nm to 710 nm region caused by dye or pigment deformation, which is advantageous in terms of optical durability.

According to one embodiment of the present specification, the dye or the pigment and the photopolymerization initiator have a weight ratio of 5:1 to 1:1. Being within this range is advantageous in preventing changes in the spectrum occurring due to dye or pigment deformation caused by photopolymerization initiator radicals, that is, preventing a transmittance increase in a 580 nm to 610 nm region and/or a transmittance decrease in a 650 nm to 710 nm region.

According to one embodiment of the present specification, the wide color gamut layer may be formed by coating a composition including a compound including a photocurable functional group; a dye or a pigment having a maximum absorption wavelength of 580 nm to 610 nm; a photopolymerization initiator; and a solvent on the transparent substrate described above, and photocuring the result. As described above, the composition for forming the wide color gamut layer may further include a dye or a pigment having a maximum absorption wavelength within 480 nm to 510 nm.

According to one embodiment of the present specification, organic solvents may be used as the solvent, and as the organic solvent, alcohol-based solvents such as methanol, ethanol, isopropyl alcohol or butanol, alkoxyalcohol-based solvents such as 2-methoxyethanol, 2-ethoxyethanol or 1-methoxy-2-propanol, ketone-based solvents such as acetone, methyl ethyl ketone, methyl isobutyl ketone, methyl propyl ketone or cyclohexanone, ether-based solvents such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether or diethylene glycol-2-ethylhexyl ether, aromatic solvents such as benzene, toluene or xylene, and the like may be used either alone or as a mixture.

According to one embodiment of the present specification, the content of the solvent may be controlled diversely within a range that does not decline properties of the composition for forming the wide color gamut layer, and is not particularly limited, however, the solvent may be included in approximately 10 parts by weight to approximately 400 parts by weight and preferably in approximately 100 parts by weight to approximately 200 parts by weight with respect to 100 parts by weight of the compound including a photocurable functional group. Proper fluidity and coatibility are obtained when the solvent is included in the above-mentioned range.

According to one embodiment of the present specification, solvents having erosivity for the transparent substrate may be used as the solvent included in the composition for forming the wide color gamut layer. When using such a solvent, the wide color gamut layer described above may have a structure eroded into the transparent substrate on a surface adjoining the transparent substrate, and accordingly, adhesive strength between the transparent substrate and the wide color gamut layer may be enhanced.

In the present specification, the wide color gamut layer being 'eroded into the transparent substrate' means at least some of the components for forming the wide color gamut layer penetrating into the transparent substrate to form the wide color gamut layer, and accordingly, at least a part of the transparent substrate surface is modified to have a structure having a thickness region in which the transparent substrate and the wide color gamut layer are present together. Meanwhile, a certain layer being formed 'on the substrate' means components for forming the corresponding layer being formed on a surface of the substrate without being substantially eroded into the substrate, and means formation of a layer that does not have a region overlapping with the substrate in a thickness direction.

As the solvent having erosivity for the transparent substrate, those having a dielectric constant (25° C.) of 5 to 20 and a polarity index of approximately 4 to approximately 6 may be used. Examples of the solvent capable of satisfying such properties may include ketones such as methyl ethyl ketone or methyl isobutyl ketone, acetate-based such as ethyl acetate or butyl acetate, and the like. However, the solvent is not limited to these examples, and any solvent satisfying the above-described properties may be used. However, even when using a solvent having erosivity for the transparent substrate, solvents that do not have erosivity for the transparent substrate may be mixed thereto and used as necessary.

According to one embodiment of the present specification, the structure having the wide color gamut layer eroded into the transparent substrate may have a layer with a thickness of approximately 100 nm to 1,000 nm.

According to one embodiment of the present specification, the thickness of the wide color gamut layer may be determined as necessary, and for example, may be determined within the range of 1 μm to 10 μm, and specifically within the range of 1 μm to 5 μm. The thickness of 1 μm or greater is advantageous in uniformly forming a coating layer including a dye or a pigment in a proper amount to improve color gamut on the whole surface, and the thickness of 10 μm or less is advantageous in preventing crack occurrences in the coating film.

The surface layer is provided on a surface of the wide color gamut layer opposite to the surface facing the transparent substrate. In other words, the transparent substrate is disposed adjoining one surface of the wide color gamut layer, and the surface layer is disposed adjoining the other surface of the wide color gamut layer. This surface layer may prevent a problem of a dye or a pigment moving toward the wide color gamut layer described above and being smeared out of the surface. In addition, by forming the surface layer separately from the wide color gamut layer including a dye or a pigment, various materials may be used for providing functions such as high hardness, scratch resistance, antireflection and antiglare.

The surface layer may include a binder resin, for example, a cured material of a compound including a photocurable functional group, and a photopolymerization initiator.

According to one embodiment of the present specification, the surface layer may be formed by coating an ultraviolet (UV) curable composition on a wide color gamut layer and photocuring the result. For example, the ultraviolet (UV) curable composition may be a composition including a compound including a photocurable functional group, a photopolymerization initiator and a solvent. The compound including a photocurable functional group, the photopolymerization initiator and the solvent are components each for forming the wide color gamut layer, and may be used in the types and the content illustrated above. In addition, as for the coating method and the photocuring, descriptions illustrated above as the method for forming the wide color gamut layer may be used. However, the surface layer does not include a dye or a pigment, and therefore, the photopolymerization initiator may be used more as necessary compared to the wide color gamut layer described above without a problem of a stability decrease in the dye or the pigment caused by the photopolymerization initiator content. For example, the surface layer may include the photopolymerization initiator in approximately 0.1 part by weight to approximately 15 parts by weight and preferably in approximately 0.1 part by weight to approximately 10 parts by weight when a total weight of the photocurable functional group-including compound or binder resin is employed as 100 parts by weight.

Among the components of the composition for forming the surface layer, the compound having a photocurable functional group may further include a photocurable monofunctional monomer.

The photocurable monofunctional monomer is not particularly limited, and examples thereof may include amino group-containing monomers such as N-substituted (meth) acrylate or N,N-substituted (meth)acrylate, hydroxyl group-containing monomers such as vinyl acetate or hydroxyalkyl (meth)acrylate, carboxyl group-containing monomers such as (meth)acrylic acid, 2-(meth)acryloyloxyacetic acid, 2-(meth)acryloyloxypropylic acid, 4-(meth)acryloyloxy butylic acid, an acrylic acid dimer, itaconic acid, maleic acid or maleic anhydride, heteroring compounds such as vinyl pyrrolidone or acryloyl morpholine, 2-ureido-pyrimidinone group-containing monomers, and the like. Specific examples thereof may preferably include tetrahydrofurfuryl acrylate (THFA), tetrahydrofurfuryl methacrylate (THFMA), hydroxyethyl acrylate (HEA), hydroxyethyl methacrylate (HEMA), carboxyethyl acrylate, carboxyethyl methacrylate and the like, but are not limited thereto. The photocurable monofunctional monomer may be included in 0 parts by weight to 20 parts by weight based on 100 parts by weight of the photocurable functional group-including compound or binder resin. By being included in 20 parts by weight or less, a decrease in the pencil hardness and the scratch resistance may be prevented.

According to one embodiment of the present specification, solvents having no erosivity for the wide color gamut layer may be used as the solvent used in the composition for forming the surface layer. The dye or the pigment smearing from the wide color gamut layer may be prevented thereby. As the solvent having no erosivity for the wide color gamut layer as above, protic solvents may be used, and for example, alcohol-based solvents such as ethyl alcohol or butanol, and cellosolve-based solvents such as methyl cellosolve may be used. As necessary, solvents such as ketones having erosivity for the transparent substrate may be mixed thereto and used. Co-using a solvent such as an erosive solvent is advantageous in terms of an effect of interlayer adhesion of the surface layer and the wide color gamut layer described above.

According to one embodiment of the present specification, the surface layer has a thickness of approximately 1 μm or greater, and for example, may have a thickness of approximately μm to approximately 20 μm, approximately 1 μm to approximately 10 μm, or approximately 1 μm to approximately 5 μm, and proper optical properties and physical properties are obtained within the thickness range as above.

According to another embodiment, the thickness of the surface layer may be from 0.2 to 1 with respect to the thickness of the wide color gamut layer. When the thickness of the surface layer is 0.2 or greater with respect to the thickness of the wide color gamut layer, a uniform surface layer may be formed, which is advantageous in protecting the wide color gamut layer, and the value being 1 or less is advantageous in terms of crack resistance of a film.

The surface layer described above may further include at least one type of organic particles and inorganic particles as necessary. These organic or inorganic particles may be included in the surface layer by being added to the composition for forming the surface layer described above.

By further including the organic or inorganic particles, the surface layer may exhibit an antiglare property through scattering light.

The organic or inorganic particles may have particle diameters of approximately 1 μm or greater in terms of optimizing a light scattering effect, and may have particle diameters of 10 μm or less in terms of obtaining proper haze and coating thickness. More specifically, the organic or inorganic particles may be particles having particle diameters of approximately 1 μm to approximately 10 μm, preferably approximately 1 μm to approximately 5 μm and more preferably approximately 1 μm to approximately 3 μm. When the organic or inorganic particles have particle diameters of less than 1 μm, an antiglare effect obtained by light scattering may be insignificant, and when the particle diameters are greater than 10 lam, the coating thickness needs to be increased to match a proper level of haze, and when the coating thickness increases, cracks may occur.

In addition, the organic or inorganic particles may have a volume average particle diameter of approximately 2 μm to approximately 10 μm, preferably approximately 2 μm to approximately 5 μm and more preferably approximately 2 μm to approximately 3 μm.

The organic or inorganic particles may be used without particular limit in the constitution as long as the particles are types used for forming antiglare films.

For example, the organic particles may use one or more types selected from among organic particles formed with acryl-based resins, styrene-based resins, epoxy resins, nylon resins, and two or more types of copolymers of the above-mentioned resins.

More specifically, the organic particles may be one or more selected from the group consisting of methyl (meth) acrylate, ethyl (meth)acrylate, propyl (meth)acrylate, n-butyl (meth)acrylate, isobutyl (meth)acrylate, t-butyl (meth)acrylate, 2-ethylhexyl (meth)acrylate, n-octyl (meth) acrylate, lauryl (meth)acrylate, stearyl (meth)acrylate, 2-hydroxyethyl (meth)acrylate, polyethylene glycol (meth)acrylate, methoxypolyethylene glycol (meth)acrylate, glylcidyl (meth)acrylate, dimethylaminoethyl (meth)acrylate, diethylaminoethyl (meth)acrylate, styrene, p-methylstyrene, m-methylstyrene, p-ethylstyrene, m-ethylstyrene, p-chlorostyrene, m-chlorostyrene, p-chloromethylstyrene, m-chloromethylstyrene, styrenesulfonic acid, p-t-butoxystyrene, m-t-butoxystyrene, vinyl acetate, vinyl propionate, vinyl butyrate, vinyl ether, allyl butyl ether, allyl glycidyl ether, (meth)acrylic acid, maleic acid, unsaturated carboxylic acid, alkyl (meth)acrylamide, (meth)acrylonitrile and (meth)acrylate, however, the present disclosure is not limited thereto.

In addition, as the organic particles, one or more selected from among polystyrene, polymethyl methacrylate, polymethyl acrylate, polyacrylate, polyacrylate-co-styrene, polymethyl acrylate-co-styrene, polymethyl methacrylate-co-styrene, polycarbonate, polyvinyl chloride, polybutylene terephthalate, polyethylene terephthalate, polyamide-based, polyimide-based, polysulfone, polyphenylene oxide, polyacetal, epoxy resins, phenol resins, silicone resins, melamine resins, benzoguamine, polydivinylbenzene, polydivinylbenzene-co-styrene, polydivinylbenzene-co-acrylate, polydiallyl phthalate and triallylisocyanurate polymers, or copolymers of two or more thereof may be used, however, the present disclosure is not limited thereto.

In addition, as the inorganic particles, one or more types selected from the inorganic particle group consisting of silicon oxide, titanium oxide, indium oxide, tin oxide, zirconium oxide and zinc oxide may be used, however, the present disclosure is not limited thereto.

The total content of the organic and the inorganic particles may be in a range of approximately 1 part by weight to approximately 20 parts by weight, preferably approximately 5 parts by weight to approximately 15 parts by weight and more preferably approximately 6 parts by weight to approximately 10 parts by weight, with respect to 100 parts by weight of the photocurable functional group-including compound or binder resin of the surface layer. When the total content of the organic and the inorganic particles is less than 1 part by weight with respect to 100 parts by weight of the photocurable functional group-including compound or binder resin, a haze value obtained by internal scattering is not sufficiently obtained, and when the total content is greater than 20 parts by weight, viscosity of the coating composition increases leading to poor coatibility, and a contrast ratio may decrease since the haze value obtained by internal scattering becomes too large.

According to one embodiment of the present specification, a difference in the refractive index between the organic or the inorganic particles and the photocurable functional group-including compound or binder resin may be from approximately 0.005 to approximately 0.1, preferably from approximately 0.01 to approximately 0.07 and more preferably from approximately 0.015 to approximately 0.05. When the difference in the refractive index is less than 0.005, a proper haze value required for antiglare may not be obtained. In addition, when the difference in the refractive index is greater than 0.1, a contrast ratio may decrease while a haze value increases with an increase in the internal scattering.

According to another embodiment, at least one of the wide color gamut layer and the surface layer may further include additives commonly used in the art such as a surfactant, an antioxidant, a UV stabilizer, a leveling agent or an antifouling agent in addition to the above-described components. In addition, the content is not particularly limited since the content may be controlled diversely within a range that does not decline properties of the wide color gamut layer, the surface layer or compositions for forming these, and for example, the content may be from approximately 0.1 parts by weight to approximately 10 parts by weight with respect to 100 parts by weight of the composition for forming the wide color gamut layer or the surface layer.

As described above, the wide color gamut layer and the surface layer may each be formed by coating and curing on a transparent substrate, however, according to another embodiment, the wide color gamut layer and the surface layer may be formed using a method including preparing a laminate of a wide color gamut layer and a surface layer; and adhering the wide color gamut layer of the laminate on a transparent substrate. Herein, a transparent adhesive, for example, an optical clear adhesive (OCA) or an optical clear resin (OCR), may be used for the adhesion.

The preparing of a laminate of a wide color gamut layer and a surface layer may be carried out by coating the composition for forming a surface layer described above on a transparent film including a dye or a pigment having a maximum absorption wavelength of 580 nm to 610 nm, and curing the result. The transparent film including a dye or a pigment having a maximum absorption wavelength of 580 nm to 610 nm may be prepared using the composition for forming a wide color gamut layer described above. For example, the laminate may be prepared using a method of coating the composition for forming a wide color gamut layer described above on a releasing film, curing the result and then removing the releasing film, or using a method of extrusion and the like. The releasing film may be removed after preparing the transparent film including a dye or a pigment, or may be removed after forming the surface layer on the transparent film including a dye or a pigment, or before adhering the laminate on a transparent substrate.

As the transparent substrate, substrates having transparency may be used without particular limit. In the present specification, "transparent" means capable of penetrating visible light, and for example, means visible transmittance being 50% or greater, preferably 70% or greater and more preferably 85% or greater. When using the wide color gamut film described above as a protective film of a polarizing plate as to be described below, substrates formed with polyester such as polyethylene terephthalate (PET), polyethylene such as ethylene vinyl acetate (EVA), a cyclic olefin polymer (COP), a cyclic olefin copolymer (COC), polyacrylate (PAC), polycarbonate (PC), polyethylene (PE), polymethyl methacrylate (PMMA), polyetheretherketone (PEEK), polyethylene naphthalate (PEN), polyetherimide (PEI), polyimide (PI), methyl methacrylate (MMA), a fluorine-based resin, triacetylcellulose (TAC) or the like may be used as the transparent substrate.

The thickness of the transparent substrate is not particularly limited, however, substrates having a thickness of approximately 20 μm to approximately 100 μm or approximately 20 μm to approximately 60 μm may be used as a range capable of satisfying hardness and other properties in order to be used in a polarizing plate as to be described below.

According to one embodiment of the present specification, average light transmittance of the wide color gamut film described above may be approximately less than 50% or approximately less than 48% in a wavelength region of 580 nm to 610 nm.

According to another embodiment, average light transmittance of the wide color gamut film described above may be approximately 70% or greater or approximately 80% or greater in a wavelength region of 400 nm to 550 nm.

According to another embodiment, the wide color gamut film described above may have a maximum absorption wavelength in a range of approximately 585 nm to approximately 600 nm or approximately from 585 nm to approximately 595 nm.

When the wide color gamut layer includes a dye or a pigment having a maximum absorption wavelength within 480 nm to 510 nm, average light transmittance of the wide color gamut film described above may be approximately less than 70% or approximately less than 60% in a wavelength region of 480 nm to 510 nm.

Due to a difference in the light transmittance and maximum absorption wavelength characteristics obtained from such a wavelength region band, light in some unnecessary wavelength bands is absorbed among light entering from a backlight unit in a liquid crystal display device to decrease intensity of the light, and a color mixing phenomenon caused by spectrum characteristics of the backlight unit and mismatch with a color filter is relieved, and by increasing color purity, a polarizing plate and a liquid crystal display device with enhanced color reproduction may be provided.

According to another embodiment, pencil hardness measured from a side of the surface layer of the wide color gamut film described above may be HB or greater, 1H or greater or 2H or greater under a 500 g load.

According to another embodiment, the wide color gamut film described above may exhibit abrasion resistance such that no scratches are produced when going back and forth 10 times under a 200 g load, a 300 g load or a 400 g load after installing steel wool #0 on a friction tester.

According to another embodiment, as for moisture-heat resistance durability of the wide color gamut film described above, changes in the transmittance is less than 2% in a 594 nm wavelength band after poly wiper wiping before and after storing the film in a thermos-hygrostat for 72 hours under relative humidity of 85% and at 85° C.

Another embodiment provides a method for preparing the wide color gamut film described above.

According to one example, the method for preparing the wide color gamut film includes forming a wide color gamut layer on a transparent substrate; and forming a surface layer on the wide color gamut layer.

As described above, the forming of a wide color gamut layer may be carried out by coating a composition for forming a wide color gamut layer on a transparent substrate, and curing the result. The forming of a surface layer may also be carried out by, as described above, coating a composition for forming a surface layer on the wide color gamut layer, and curing the result.

According to a specific example, the method for preparing the wide color gamut film includes coating a composition for forming a wide color gamut layer on a transparent substrate, and curing the result; and coating a composition for forming a surface layer on the wide color gamut layer, and curing the result. Herein, when the composition for forming a wide color gamut layer and the composition for forming a surface layer include a compound including a photocurable functional group, photocuring, specifically ultraviolet (UV) curing, may be carried out as the curing. According to one example, partial curing or half curing may be carried out instead of full curing in the curing after coating the composition for forming a wide color gamut layer. Subsequently, after coating the composition for forming a surface layer, the composition for forming a wide color gamut layer and the composition for forming a surface layer may be fully cured. When the wide color gamut layer is cured with the surface layer in a partially cured or half cured state, an uncured binder component of the wide color gamut layer is cured with components of the surface layer, which is advantageous in securing adhesion between the two layers.

The method of coating the compositions is not particularly limited as long as it is capable of being used in the art, and examples thereof may include a bar coating method, a knife coating method, a roll coating method, a blade coating method, a die coating method, a microgravure coating method, a comma coating method, a slot die coating method, a lip coating method, a solution casting method or the like.

Next, a wide color gamut layer or a surface layer may be formed by carrying out a photocuring reaction through irradiating ultraviolet rays on the coated composition. As necessary, the coated surface of the composition is flattened before irradiating the ultraviolet rays, and a drying process for volatizing a solvent included in the composition may be further carried out.

The amount of the ultraviolet irradiation may be, for example, from approximately 200 mJ/cm$^2$ to approximately 600 mJ/cm$^2$ for full curing, and from approximately 50 mJ/cm$^2$ to approximately 200 mJ/cm$^2$ for partial curing or half curing. The light source of the ultraviolet irradiation is not particularly limited as long as it is capable of being used in the art, and examples thereof may include a high pressure mercury lamp, a metal halide lamp, a black light fluorescent lamp and the like.

According to another example, the method for preparing the wide color gamut film includes preparing a laminate of a wide color gamut layer and a surface layer; and adhering the wide color gamut layer of the laminate on a transparent substrate.

The preparing of a laminate of a wide color gamut layer and a surface layer may be carried out by coating the composition for forming a surface layer described above on a transparent film including a dye or a pigment having a maximum absorption wavelength of 580 nm to 610 nm, and curing the result. The transparent film including a dye or a pigment having a maximum absorption wavelength of 580 nm to 610 nm may be prepared using the composition for forming a wide color gamut layer described above. For example, the transparent film including a dye or a pigment having a maximum absorption wavelength of 580 nm to 610 nm may be prepared using a method of coating the composition for forming a wide color gamut layer described above on a releasing film, curing the result and then removing the releasing film, or using a method of extrusion and the like. The releasing film may be removed after preparing the transparent film including a dye or a pigment, or may be removed after forming the surface layer on the transparent film including a dye or a pigment, or before adhering the laminate on a transparent substrate. Herein, as for the processes of coating and curing the composition for forming a wide color gamut layer and the composition for forming a surface layer, descriptions on the preparation methods provided above may be used.

The adhering of the laminate of the wide color gamut layer and the surface layer on a transparent substrate may use a transparent adhesive, for example, an optical clear adhesive (OCA) or an optical clear resin (OCR) as necessary. For example, adhesives for a polarizer having transparency and capable of maintaining a polarizing property of the polarizer may be used for the adhesion. The adhesive capable of being used is not particularly limited as long as it is known in the art. For example, one component or two component polyvinyl alcohol (PVA)-based adhesives, acryl-based adhesives, polyurethane-based adhesives, epoxy-based adhesives, styrene butadiene rubber (SBR)-based adhesives, hot melt-type adhesives or the like may be included, however, the present disclosure is not limited to these examples. In the adhesion, the adhesive layer may have a thickness of approximately 0.1 μm to approximately 10 μm or approximately 0.1 μm to approximately 5 μm, however, the thickness is not limited to these examples.

Another embodiment of the present specification provides a polarizing plate including a polarizer; and the wide color gamut film provided on at least one surface of the polarizer as a protective film.

A polarizer has a property capable of extracting only light vibrating in one direction from light entering while vibrating in various directions, and those known in the art may be used. For example, those stretching iodine-absorbed poly vinyl alcohol (PVA) with strong tension may be used as the polarizer. More specifically, the polarizer may be prepared by swelling a PVA film by immersing the film in an aqueous solution, dyeing the swollen PVA film with a dichroic material providing polarizability, stretching the dyed PVA film to arrange the dichroic dye materials side by side in the stretching direction, and calibrating the color of the PVA film gone through the stretching. However, the polarizing plate of the present disclosure is not limited thereto.

According to one embodiment of the present specification, the wide color gamut film described above may be included in both surfaces of the polarizer, and in addition thereto, the wide color gamut film described above may be provided on any one surface, and a protective film known in the art may be provided on the other surface as necessary. As the protective film known in the art, those illustrated as the transparent substrate described above may be used.

The polarizer and the protective film may be adhered through lamination using an adhesive and the like. The adhesive capable of being used is not particularly limited as long as they are known in the art. Examples thereof may include water-based adhesives, one component or two component polyvinyl alcohol (PVA)-based adhesives, polyurethane-based adhesives, epoxy-based adhesives, styrene butadiene rubber (SBR)-based adhesives, hot melt-type adhesives or the like, however, the present disclosure is not limited to these examples.

When laminating and adhering the wide color gamut film described above on the polarizer, laminating so that the transparent substrate is attached on the polarizer, and the surface layer is located outside of the polarizing plate is preferred.

As in the embodiment described above, the polarizing plate including the wide color gamut film may be used in various fields as well as in a liquid crystal display device. For example, the polarizing plate including the wide color gamut film may be used in applications of mobile communication terminals, smart phones, other mobile devices, display devices, electronic bulletin boards, outdoor electronic display boards and various display units.

According to one embodiment of the present specification, the polarizing plate may be a polarizing plate for twisted nematic (TN) or super twisted nematic (STN) liquid crystals, or a polarizing plate for a horizontal alignment mode such as in-plane switching (IPS), Super-IPS or fringe field switching (FFS), or a polarizing plate for a vertical alignment mode.

Another embodiment of the present specification provides a liquid crystal display device including a backlight unit; a liquid crystal panel provided on one side of the backlight unit; and the polarizing plate of the embodiments described above provided between the backlight unit and the liquid crystal panel, wherein, in the polarizing plate, the wide color gamut film is provided so as to face the backlight unit.

According to one embodiment of the present specification, the liquid crystal display device may further include one, two or more prism sheets between the backlight unit and the polarizing plate including the wide color gamut film.

In the liquid crystal display device, the surface layer of the wide color gamut film described above is located adjacent to a backlight unit, a prism sheet, a diffusion film or DBEF, and damages such as splitting of a polarizing plate may be prevented even when the polarizing plate sags to the backlight unit side with the liquid crystal display device being thinner and larger, and as a result, excellent optical properties may be maintained.

FIG. 1 is a diagram illustrating a liquid crystal display device according to one embodiment of the present disclosure. When referring to FIG. 1, the liquid crystal display device (1) of the present specification includes a backlight unit (10); a prism sheet (20) provided on the backlight unit (10); and a polarizing plate (100) provided on the prism sheet (20) and laminated so that a wide color gamut film (40) face toward the prism sheet (20).

The backlight unit (10) includes a light source irradiating light from the back of a liquid crystal panel, and types of the light source are not particularly limited, and general light sources for a liquid crystal display device such as CCFL, HCFL or LED may be used.

In the present specification, the term 'upper surface' means a surface disposed so as to face a viewer when a polarizing plate is installed in a device such as a liquid crystal display. The term 'upper' means a direction facing a viewer when a polarizing plate is installed in a device. On the other hand, the term 'lower surface' or 'lower' means a surface or a direction disposed so as to face an opposite side of a viewer when a polarizing plate is installed in a device.

The prism sheet (20) is provided on an upper part of the backlight unit (10). The prism sheet (20) is provided to increase light brightness again since light emitting from the backlight unit (10) has a decrease in the brightness while passing through a light guide plate and a diffusion sheet (not shown in the diagram), and such a prism sheet (20) is provided below a lower polarizing plate. However, the prism sheet (20) includes an unevenness structure, and therefore, a lower protective film of the lower polarizing plate touching the prism sheet (20) is damaged causing a problem of an increase in the haze. However, in the liquid crystal display device of the present specification, such a problem may be prevented by laminating the polarizing plate (100) so that a surface layer (30*c*) of the wide color gamut film (40) faces the prism sheet (20).

In other words, when referring to FIG. 1, on the prism sheet (20), a polarizing plate (100) including a generalpurpose protective film (60) provided on one surface of a polarizer (50), and the wide color gamut film (40) of the present specification including a substrate (30a), a wide color gamut layer (30b) and a surface layer (30c) attached on the other surface is provided.

Herein, a structure laminating the wide color gamut film (40) of the present specification on a lower part of the liquid crystal display device, that is, to face the prism sheet (20) is obtained. With such a lamination structure, a problem of a haze increase caused by the polarizing plate (100) being damaged due to unevenness of the prism sheet (20) is prevented, and excellent optical properties may be obtained. In addition, as described above, a liquid crystal display device having enhanced color reproduction may be provided by relieving a color mixing phenomenon caused by spectrum characteristics of a backlight in the liquid crystal display device and by increasing color purity due to transmittance characteristics obtained from a wavelength of the wide color gamut film (40).

According to another embodiment, a diffusion film, a dual brightness enhancement film (DBEF) (not shown in the drawing) or the like may be further included between the prism sheet (20) and the polarizing plate (100), or between the backlight unit (10) and the prism sheet (20). When a diffusion film or a DBEF film is present between the prism sheet (20) and the polarizing plate (100), the wide color gamut film (40) of the polarizing plate (100) touches the diffusion film or the DBEF film, and even in this case, problems of damages on a lower polarizing plate caused by the diffusion film, the DBEF film or the like and an increase in the haze may be equally prevented.

Layers provided on an upper part of the polarizing plate (100) are in accordance with general liquid crystal display device structures, and although a structure of consecutively laminating a lower glass substrate (70), a thin film transistor (75), a liquid crystal layer (80), a color filter (85), an upper glass substrate (90) and an upper polarizing plate (95) is illustrated in FIG. 1, the liquid crystal display device of the present specification is not limited thereto, and structures in which some of the layers illustrated in FIG. 1 are modified or excluded as necessary, or other layers, substrates, films, sheets and the like are added may all be included.

Hereinafter, workings and effects of the present specification will be described in more detail with reference to specific examples of the present specification. However, such examples are for illustrative purposes only, and the scope of a right of the present disclosure is not defined thereby.

EXAMPLE

Example 1

(1) Preparation of Composition for Forming Wide Color Gamut Layer A1

Composition A1 was prepared by mixing 80 g of trimethylolpropane triacrylate (TMPTA), 20 g of hexafunctional urethane acrylate (product name: UA-306I), 1 g of a porphyrin-based dye having a maximum absorption wavelength of 593 nm, 1 g of a photopolymerization initiator (product name: Irgacure 184) and 100 g of a methyl ethyl ketone (MEK) solvent.

(2) Preparation of Composition for Forming Surface Layer

Composition B1 was prepared by mixing 95 g of trimethylolpropane triacrylate, 5 g of a photopolymerization initiator (Irgacure 184) and 100 g of a methyl ethyl ketone (MEK) solvent.

(3) Preparation of Wide Color Gamut Film

Composition A1 was coated on a TAC film having a thickness of 60 μm so that the dried thickness became 3 μm. After drying the result for 2 minutes at 60° C., the result was cured by irradiating UV with 150 mJ/cm$^2$ using a mercury lamp to form a half-cured wide color gamut layer. Subsequently, on the half-cured wide color gamut layer, Composition B1 was coated to 2 μm, and then the result was dried for 2 minutes at 60° C., irradiated with 300 mJ/cm$^2$ using a mercury lamp and cured to form a surface layer.

Example 2

(1) Preparation of Composition for Forming Surface Layer B2

An antiglare Composition B2 was prepared by adding 50 g of pentaerythritol tri(tetra)acrylate, 50 g of a polymer (BEAMSET 371, Arakawa Chemical Industries, Ltd., weight average molecular weight Mw 40,222), 5 g of a photopolymerization initiator (Irgacure 184), 100 g of a methyl ethyl ketone (MEK) solvent, and 2 g of acryl-styrene copolymer resin particles (manufactured by Sekisui Plastics Co., Ltd.) having a volume average particle diameter of 2 μm and a refractive index of 1.550.

(2) Preparation of Wide Color Gamut Film

A wide color gamut film was prepared in the same manner as in Example 1 except that Composition B2 was used instead of Composition B1.

Example 3

(1) Preparation of Composition for Forming Wide Color Gamut Layer A2

Composition A2 was prepared by mixing 80 g of trimethylolpropane triacrylate (TMPTA), 20 g of hexafunctional urethane acrylate (product name: UA-306I), 1 g of a porphyrin-based dye having a maximum absorption wavelength of 593 nm, 0.5 g of a FDB-007 dye (Yamada Chemical Co., Ltd.) having a maximum absorption wavelength of 493 nm, 1 g of a photopolymerization initiator (product name: Irgacure 184) and 100 g of a methyl ethyl ketone (MEK) solvent.

(2) Preparation of Wide Color Gamut Film

A wide color gamut film was prepared in the same manner as in Example 1 except that Composition A2 was used instead of Composition A1.

Comparative Example 1

Composition A1 was coated on a TAC film having a thickness of 60 μm so that the dried thickness became 3 μm. After drying the result for 2 minutes at 60° C., the result was cured by irradiating with approximately 300 mJ/cm$^2$ using a mercury lamp to form a wide color gamut layer, and the surface layer was not formed.

Comparative Example 2

A composition mixing 100 g of poly(methyl methacrylate) (PMMA) that is a thermoplastic resin, 1 g of a porphyrin-based dye having a maximum absorption wavelength of 593 nm and 100 g of a MEK solvent was coated on a TAC film having a thickness of 60 μm. Subsequently, heat was applied thereto for 5 minutes at 90° C. to form a wide color gamut layer having a thickness of 5 μm. Next, Composition B1 was coated to 2 μm on the dried wide color gamut layer, the result was dried for 2 minutes at 60° C., and cured by irradiating with 300 mJ/cm² using a mercury lamp to form a surface layer.

Experimental Example

<Measurement Method>

For the films of Examples 1 to 3 and Comparative Examples 1 and 2, properties were measured using the following methods.

1) Transmittance and Maximum Absorption Wavelength

Transmittance and a maximum absorption wavelength were measured using a UV-VIS-NIR spectrometer (Solidspec-3700, SHIMADZU Corporation), and as the average transmittance, transmittance in a 300 nm to 800 nm wavelength was measured with an integrating sphere type.

2) Moisture-Heat Resistance

After storing the film in a 85% and 85° C. thermoshygrostat for 75 hours and then poly wiper wiping, changes in the transmittance in a 594 nm wavelength band were measured. It was determined as OK when changes in the transmittance were less than 2%, and NG when changes in the transmittance were 2% or greater.

3) Eraser Polishing Test

It was evaluated as OK when the dye was not smeared when the film surface was erased with an eraser, and NG when the dye was smeared.

4) Scratch Resistance

For the coating layer surfaces of the films of Examples 1 and 2 and Comparative Example 1, a maximum load not causing scratches after applying a different load to Steel wool #0 and rubbing 10 times by going back and forth was identified.

5) Pencil Hardness

Pencil hardness was measured under a 500 g load using a pencil hardness tester (accuracy tester, manufacturer: Choongbuk Tech.). Changes in the surface were observed through applying scratches on the coating layer surface maintaining a degree angle while changing standard pencil (Mitsubishi) from 6B to 9H in accordance with the ASTM 3363-74. Each experimental value was described as an average value after measuring 5 times.

6) Adhesion

Adhesive strength was evaluated using a cross-cut tape test method. On the cured polarizer protective film, 11 lines were each drawn vertically and horizontally at 1 mm intervals using a knife, then an adhesive tape was attached thereto and removed abruptly, and adhesive strength was evaluated by the area where the film was not removed. The area where the film was not removed being 100% was evaluated as 5B, the area being 95% to 99% was evaluated as 4B, the area being 85% to 94% was evaluated as 3B, the area being 65% to 84% was evaluated as 2B, the area being 35% to 64% was evaluated as 1B, and the area being 34% or less was evaluated as 0B.

Results of the physical property measurement results are shown in the following Table 1.

TABLE 1

| | Example 1 | Example 2 | Example 3 | Comparative Example 1 | Comparative Example 2 |
|---|---|---|---|---|---|
| Maximum Absorption Wavelength (Unit: nm) | 594 | 594 | 594 | 594 | 593 |
| Average Transmittance in 400 nm to 550 nm Wavelength (Unit: %) | 84.1 | 84.1 | 75.1 | 83.7 | 84.3 |
| Average Transmittance in 580 nm to 610 nm Wavelength (Unit: %) | 31.3 | 31.3 | 31.0 | 35.293 | 31.2 |
| Average Transmittance in 480 nm to 510 nm Wavelength (Unit: %) | 88.5 | 88.5 | 64.8 | 87.9 | 88.7 |
| Moisture-Heat Resistance (Change in 594 nm Transmittance) | OK | OK | OK | NG | OK |
| Eraser Polishing Test | OK | OK | OK | NG | OK |
| Scratch Resistance | 500 g | 700 g | 400 g | 150 g | 100 g |
| Pencil Hardness | 3H | 3H | 3H | H | HB |
| Adhesion | 5B | 5B | 5B | 5B | 0B |

As shown in Table 1, Examples 1 to 3, the wide color gamut film according to one embodiment of the present specification, exhibited excellent effects in the moisture-heat resistance, the eraser polishing test, the scratch resistance and the pencil hardness compared to Comparative Example 1 that did not form a surface layer, and particularly, exhibited 400 g or greater of scratch resistance and 2H or greater of pencil hardness, which are proper properties as a polarizing plate for a liquid crystal display.

Specifically, Examples 1 and 2, the wide color gamut film according to one embodiment of the present specification, had average light transmittance of 80% or greater in a 400 nm to 550 nm wavelength region, had average light transmittance of less than 50% in a 580 nm to 610 nm wavelength region, and exhibited unique transmittance characteristics of a wavelength having a maximum absorption wavelength of 585 nm to 600 nm. Light in the wavelength region of 580 nm to 610 nm and light in the 480 nm to 510 nm wavelength region exhibit orange/bluish green color, which are regions decreasing color purity of RGB, and accordingly, it was seen that Examples 1 and 2, the wide color gamut film according to one embodiment of the present specification, were capable of enhancing color gamut through increasing color purity by selectively absorbing the region, and thereby had an excellent wide color reproduction effect. In addition, it was seen that Examples 1 and 2 also had excellent effects in the moisture-heat resistance, the eraser polishing test, the scratch resistance and the pencil hardness test compared to Comparative Example 1 that did not form a surface layer.

In addition, Example 3 had average transmittance of less than 70% in a 480 nm to 510 nm wavelength. Specifically, color gamut was able to be further enhanced by additionally absorbing light in a 480 nm to 510 nm wavelength region.

Furthermore, it was seen that Examples 1 to 3 including a photocurable functional group had significant effects in pencil hardness and adhesion compared to Comparative Example 2 including a thermoplastic resin.

Hereinbefore, preferred examples of the present specification have been described, however, the present disclosure is not limited thereto, and various modification may be made within the patent claims and detailed descriptions of the disclosure, and these also belong to the scope of the present disclosure.

The invention claimed is:

1. A liquid crystal display device comprising:
   a backlight unit;
   a color filter;
   a liquid crystal panel provided on one side of the backlight unit; and
   a polarizing plate provided between the backlight unit and the liquid crystal panel, the polarizing plate comprising:
      a polarizer; and
      a wide color gamut film provided on at least one surface of the polarizer as a protective film, the wide color gamut film comprising:
         a transparent substrate;
         a wide color gamut layer provided on one surface of the transparent substrate, and including a compound including a photocurable functional group, and a dye or pigment having a maximum absorption wavelength in a range of 580 nm to 610 nm; and
         a surface layer provided on the wide color gamut layer,
         wherein the transparent substrate, the wide color gamut layer and the surface layer are consecutively laminated,
      wherein the polarizing plate is provided such that the wide color gamut film faces the backlight unit, and the wide color gamut film increases color purity of RGB base colors and enhances wide color reproduction.

2. The liquid crystal display device of claim 1, wherein the wide color gamut layer is formed from a composition whose change in transmittance, which is measured by the following Equation 1, is less than 5%:

$$\text{changes in transmittance} = \frac{\left(\begin{array}{l}\text{average light transmittance in 650 nm to}\\\text{710 nm region wavelength before } UV \text{ curing} -\\\text{average light transmittance in 650 nm to}\\\text{710 nm region wavelength after } UV \text{ curing}\end{array}\right)}{\text{average light transmittance in 650 nm to}} \times 100 \quad [\text{Equation 1}]$$
$$\text{710 nm region wavelength before } UV \text{ curing}$$

wherein, in Equation 1, the ultraviolet (UV) curing means coating the composition including the dye or pigment on the transparent substrate, and curing the result by ultraviolet rays having a 290 nm to 320 nm wavelength with an irradiation amount of 20 mJ/cm$^2$ to 600 mJ/cm$^2$.

3. The liquid crystal display device of claim 1, wherein the compound including a photocurable functional group includes one or more types selected from the group consisting of a multifunctional acrylate-based monomer, a multifunctional acrylate-based oligomer and a multifunctional acrylate-based elastic polymer.

4. The liquid crystal display device of claim 1, wherein the wide color gamut film has a pencil hardness of H or greater under a 500 g load.

5. The liquid crystal display device of claim 1, wherein the wide color gamut layer further includes a binder resin and a photopolymerization initiator.

6. The liquid crystal display device of claim 5, wherein the photopolymerization initiator is included in 0.5 parts by weight to 2 parts by weight with respect to 100 parts by weight of the binder resin.

7. The liquid crystal display device of claim 5, wherein the dye or pigment and the photopolymerization initiator have a weight ratio of 5:1 to 1:1.

8. The liquid crystal display device of claim 1, wherein the wide color gamut layer is formed by coating a composition including the compound including a photocurable functional group, the dye or pigment having a maximum absorption wavelength in a range of 580 nm to 610 nm, a photopolymerization initiator, and a solvent on the transparent substrate; and then photocuring the result.

9. The liquid crystal display device of claim 8, wherein the compound including a photocurable functional group includes a multifunctional acrylate-based monomer or a multifunctional acrylate-based oligomer that is trifunctional or tetrafunctional.

10. The liquid crystal display device of claim 1, wherein the surface layer is formed by coating a composition including a compound including a photocurable functional group, a photopolymerization initiator and a solvent on the wide color gamut layer, and then photocuring the result.

11. The liquid crystal display device of claim 1, wherein a thickness of the surface layer is from 0.2 to 1 with respect to a thickness of the wide color gamut layer.

12. The liquid crystal display device of claim 1, wherein the surface layer further includes at least one type of organic particles and inorganic particles.

13. The liquid crystal display device of claim 1, wherein the wide color gamut layer and the surface layer are formed on the transparent substrate by adhering a laminate of the wide color gamut layer and the surface layer on the transparent substrate.

14. A method for preparing the liquid crystal display device of claim 1, the method comprising:
   (a) coating a composition comprising a compound including the photocurable functional group and the dye or pigment having a maximum absorption wavelength in a range of 580 nm to 610 nm on the transparent substrate, and curing the result to form the wide color gamut layer; and
   (b) coating a composition for forming the surface layer on the wide color gamut layer and curing the result; or
   (c) preparing a laminate of the wide color gamut layer and the surface layer, and adhering the wide color gamut layer of the laminate on the transparent substrate.

15. A liquid crystal display device comprising:
   a backlight unit;
   a color filter;
   a liquid crystal panel provided on one side of the backlight unit; and
   a polarizing plate provided between the backlight unit and the liquid crystal panel, the polarizing plate comprising:
      a polarizer; and
      a wide color gamut film provided on at least one surface of the polarizer as a protective film, the wide color gamut film comprising:
         a transparent substrate;
         a wide color gamut layer provided on one surface of the transparent substrate, and including:
            a compound including a photocurable functional group, and a dye or pigment having a maximum absorption wavelength in a range of 580 nm to 610 nm; and
            a dye or pigment having a maximum absorption wavelength within 480 nm to 510 nm that is an azo series dye derivative, a coumarin series dye derivative, a fluorescein series dye derivative, a cyanine series dye derivative, or a BODIPY series derivative; and
a surface layer provided on the wide color gamut layer,
wherein the transparent substrate, the wide color gamut layer and the surface layer are consecutively laminated,
wherein the polarizing plate is provided such that the wide color gamut film faces the backlight unit, and the wide color gamut film increases color purity of RGB base colors and enhances wide color reproduction.

16. The liquid crystal display device of claim 15, wherein the wide color gamut layer is formed by coating a composition including the compound including a photocurable functional group, the dye or pigment having a maximum absorption wavelength in a range of 580 nm to 610 nm, the dye or a pigment having a maximum absorption wavelength within 480 nm to 510 nm, a photopolymerization initiator, and a solvent on the transparent substrate, and then photocuring the result.

17. A method for preparing the liquid crystal display device of claim 15, the method comprising:
(a) coating a composition comprising the compound including a photocurable functional group, the dye or pigment having a maximum absorption wavelength in a range of 580 nm to 610 nm, and a dye or pigment having a maximum absorption wavelength within 480 nm to 510 nm that is an azo series dye derivative, a coumarin series dye derivative, a fluorescein series dye derivative, a cyanine series dye derivative, or a BODIPY series derivative on the transparent substrate, and curing the result to form the wide color gamut layer; and
(b) coating a composition for forming the surface layer on the wide color gamut layer and curing the result; or
(c) preparing a laminate of the wide color gamut layer and the surface layer, and adhering the wide color gamut layer of the laminate on the transparent substrate.

18. A liquid crystal display device comprising:
a backlight unit;
a color filter;
a liquid crystal panel provided on one side of the backlight unit; and
a polarizing plate provided between the backlight unit and the liquid crystal panel, the polarizing plate comprising:
a polarizer; and
a wide color gamut film provided on at least one surface of the polarizer as a protective film, the wide color gamut film comprising:
a transparent substrate;
a wide color gamut layer provided on one surface of the transparent substrate, and including a compound including a photocurable functional group, and a dye or pigment that is a porphyrin derivative compound or a squarylium derivative compound having a maximum absorption wavelength in a range of 580 nm to 610 nm; and
a surface layer provided on the wide color gamut layer,
wherein the transparent substrate, the wide color gamut layer and the surface layer are consecutively laminated,
wherein the polarizing plate is provided such that the wide color gamut film faces the backlight unit, and the wide color gamut film increases color purity of RGB base colors and enhances wide color reproduction.

19. A method for preparing the liquid crystal display device of claim 18, the method comprising:
coating a composition comprising the compound including a photocurable functional group and the dye or pigment that is a porphyrin derivative compound or a squarylium derivative compound and has a maximum absorption wavelength in a range of 580 nm to 610 nm on the transparent substrate and curing the result to form the wide color gamut layer; and
coating a composition for forming the surface layer on the wide color gamut layer and curing the result.

20. A method for preparing the liquid crystal display device of claim 18, the method comprising:
preparing a laminate of the wide color gamut layer and the surface layer; and
adhering the wide color gamut layer of the laminate on the transparent substrate.

* * * * *